United States Patent [19]

Lowe

[11] Patent Number: 5,320,790
[45] Date of Patent: Jun. 14, 1994

[54] METHOD FOR PRODUCING A DURABLE TACTILE WARNING SURFACE

[76] Inventor: Michael Lowe, 2634 Firestone Dr., Clearwater, Fla. 34621

[21] Appl. No.: 911,901

[22] Filed: Jul. 10, 1992

[51] Int. Cl.$^5$ .................. B28B 1/16; B32B 31/12; C04B 41/00; E04B 1/16
[52] U.S. Cl. .................................. 264/31; 249/2; 249/127; 249/140; 264/35; 264/69; 264/74; 264/102; 264/130; 264/131; 264/133; 264/134; 264/256; 264/259; 264/293; 264/296; 264/316; 264/333; 264/336; 404/6; 404/9; 404/15; 425/470
[58] Field of Search ................. 404/6, 9, 15; 264/31-36, 333, 256, 69, 71, 316, 313, 133, 337, 74, 130, 131, 134, 259, 293, 296, 102, 336; 425/470; 249/2, 127, 140

[56] References Cited

U.S. PATENT DOCUMENTS

| | | | |
|---|---|---|---|
| 336,055 | 2/1886 | Krispin | 425/470 |
| 939,071 | 11/1909 | Ney | 264/34 |
| 1,154,255 | 9/1915 | Landis | 264/333 X |
| 1,909,562 | 5/1933 | Ambrosio | 425/470 X |
| 1,991,996 | 2/1935 | Bakker | 264/35 |
| 2,303,395 | 12/1942 | Schultz et al. | 264/259 X |
| 2,513,648 | 8/1950 | Tezzi | 264/259 |
| 2,672,670 | 3/1954 | Rhodes | 264/333 X |
| 2,811,767 | 11/1957 | Dufford | 425/470 |
| 2,964,800 | 12/1960 | Dorsett | 264/316 X |
| 3,086,431 | 4/1963 | Perry, Jr. | 264/33 |
| 3,484,514 | 12/1969 | Longinotti | 264/333 X |
| 3,775,529 | 11/1973 | Steenson et al. | 264/296 X |
| 3,910,711 | 10/1975 | Moorhead | 264/316 X |
| 4,115,976 | 9/1978 | Rohrer | 264/35 X |
| 4,271,111 | 6/1981 | Sheber | 264/316 X |
| 4,321,024 | 3/1982 | Terraillon | 249/2 X |
| 4,353,949 | 10/1982 | Kyminas et al. | 427/277 X |
| 4,620,816 | 11/1986 | Kupfer | 404/6 |
| 4,715,043 | 12/1987 | Schmanski | 404/15 X |
| 4,740,348 | 4/1988 | Rose | 264/296 |
| 4,800,054 | 1/1989 | Roestenberg | 264/36 X |

FOREIGN PATENT DOCUMENTS

86/03433 6/1986 PCT Int'l Appl. .

Primary Examiner—Karen Aftergut
Attorney, Agent, or Firm—Arthur W. Fisher, III

[57] ABSTRACT

A patterned tool and method for producing a durable tactile warning surface for sidewalks and other walkways including pouring a concrete base, applying pigmented or colored hardener to the upper surface of the concrete base, stamping the upper surface of the concrete base with the patterned tool including a substantially flat member having a plurality of symmetrically disposed recesses of a predetermined diameter and depth formed on the lower surface thereof and a plurality of corresponding vent channels formed through the substantially flat member in communication with each corresponding recess and curing the concrete base to form a durable tactile warning surface including a plurality of symmetrically disposed raised elements of a predetermined diameter, height and spacing corresponding to the plurality of recesses to produce an uneven surface visually contrasting with adjacent surface areas.

2 Claims, 7 Drawing Sheets

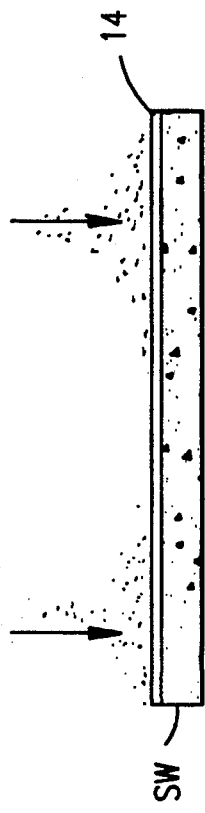
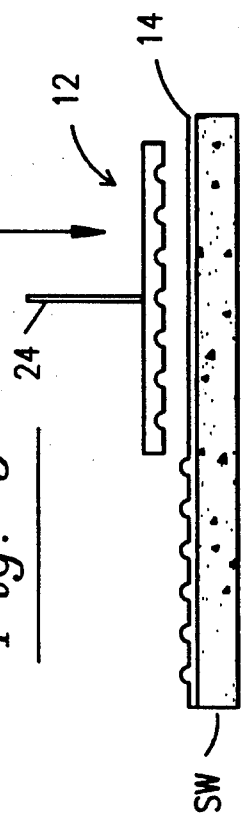
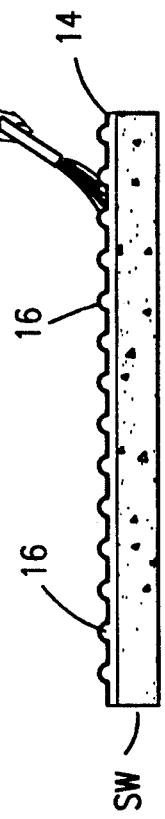
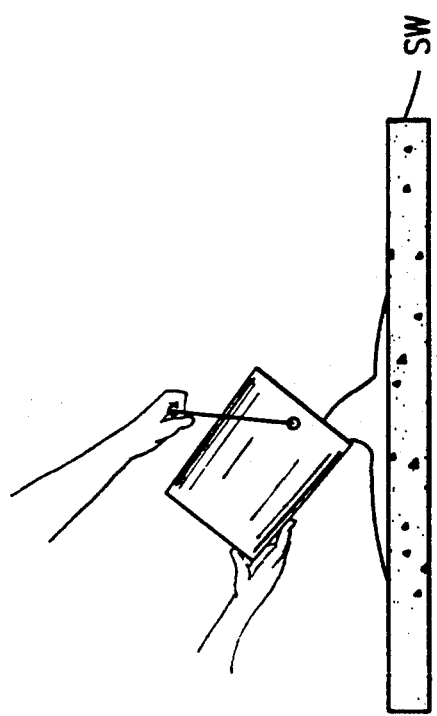
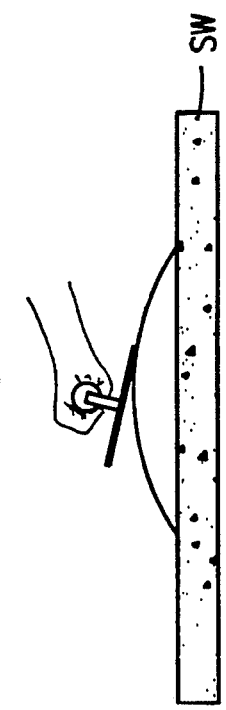

METHOD FOR PRODUCING A DURABLE TACTILE WARNING SURFACE

BACKGROUND OF THE INVENTION

1. Field of the Invention

A patterned tool and method for producing a durable tactile warning surface for sidewalks and other walkways.

2. Description of the Prior Art

As a society, we have come to recognize the importance of providing means for the visually impaired to more fully participate in the main stream of recreational and employment opportunities. Concomitantly, numerous efforts have been undertaken to improve and enhance means to allow self-sufficient movement from place to place. Of particular importance in realizing such aims and goals is the ability of movement on public sidewalks and the like without assistance.

As a matter of fact, 28 CFR Part 36 sets forth specific rules of detectable warnings on walking surfaces.

U.S. Pat. No. 4,310,370 shows a process for producing articles comprising the steps of placing into mutual contact and laminating a hardenable decorative material layer and an expansion-contraction deformable sheet provided with regions susceptible to expansion-contraction deformation and regions not susceptible to deformation; causing the deformable sheet to undergo deformation under pressure to impart a pattern of unevennesses to the decorative material layer in contact with the sheet; and causing the hardenable decorative material layer to fully harden. The sheet deformed under pressure imparts a pattern of surface unevenness corresponding to the two kinds of regions to the decorative material layer. The degree or surface unevenness can be controlled by adjusting the pressure. Colored patterns corresponding to the unevennesses can also be formed.

U S. Pat. No. 3,836,619 describes a method of forming an artificial stone comprising the steps of providing a flexible mold; pouring a curable mixture of polyester plastic and catalyst in the mold to form a polyester plastic body having a configured surface; scraping off excess of the curable mixture by applying sufficient pressure to depress the edges of the mold and form a raised lip on the plastic body; curing the mixture; removing the plastic body from the mold; spraying the configured surface with a liquid color layer and drying; spraying the color layer with a curable, transparent, liquid coat and curing said coat until the outer surface is gelled; spraying a thin layer of sand on the outer surface of said transparent coat, and curing the transparent coat, thereby bonding the sand layer to the transparent coat layer.

U.S. Pat. No. 4,349,588 teaches a method for producing simulated brick, tile wall or floor using cement, water-based adhesive and water insoluble powdered pigment. The mixture is applied and then partially set. Scoring indentations are made to remove cement. After being completely set, mortar is placed in the indentations as a grout and allowed to set. The final step is a clear water-resistant coating on the entire surface.

U.S. Pat. No. 4,126,727 shows a resinous polymer sheet material having selective, decorative effects comprising a first layer of a resinous polymer composition; a pattern or design printed on and adhered to the surface of the first layer of resinous polymer composition and having relatively dark colored printed portions and relatively light colored printed portions A second layer of a resinous polymer composition is applied on and adhered to the printed pattern or design and to the first layer of resinous polymer composition. The second layer of resinous polymer composition includes a layer of relatively small, flat, decorative chips or flakes comprising a very thin layer of translucent or transparent platelets provided with coating. Light wave interference and color absorptive effects are created as light waves strike and reflect from the second layer of resinous polymer composition whereby the decorative chips or flakes located over the relatively dark colored printed portions are discernible from eye-level or a distance of about five feet whereas those decorative chips or flakes located over the relatively light colored printed portions are indiscernible from eye-level or a distance of about five feet.

U.S. Pat. No. 4,105,816 describes a decorative relief finished surface formed to a substrate by applying an undercoat material to a predetermined thickness and forming an uneven pattern with a rolling device having a plurality of convex parts of curved continued, disconnected to perforated line shape. Then, the top portions of the projections of the partially hardened surface which extend beyond a predetermined height are pressed with a pressing roll such that the projections are uniformly flattened to a predetermined thickness while the rest of the convex parts are left unflattened.

U.S. Pat. No. 3,882,218 shows embossed decorative patterns and decorative laminates, particularly textured film finished structural elements and the method of manufacture wherein a resilient material such as a wadding sheet or pad sheet is interposed between the surface film and the substrate.

U.S. Pat. No. 3,152,002 describes a process of making elastomeric flooring of varigated color comprising the steps of coating a sheet of backing material with a liquid polyvinyl chloride plastisol, delivering a charge of solid unheated plastic granules of polyvinyl chloride compound and different colors to the coated backing sheet, spreading the granules in a layer of substantially uniform thickness in the liquid plastisol, partially curing the plastisol to fix the position of the granules on the backing sheet and then molding the components into a product of the desired surface texture.

U S. Pat. No. 3,012,285 teaches a process of producing an elastomeric covering for floors, walls and the like comprising the steps of mixing a plurality of moldable vinyl elastomers of different shades of the same base color, calendering the mixture to form a solid mottled sheet of the selected colors, heating the calendered elastomeric sheet to molding temperature, molding the overall surface area of the sheet by applying a mold having a plurality of scattered low protuberances of irregular outline and of varying size, depth, configuration and distribution, removing the mold from the molded sheet, coating the molded surface of the elastomeric sheet with a paint of a color contrasting with the base color and then removing the colored paint immediately to expose plane surface areas of the molded elastomeric sheet while leaving the depressed areas of the cavities thereof permanently coated with the contrasting colored paint.

U.S. Pat. No. 2,577,241 shows a method of producing a face configuration of variable pattern which comprises impressing in the face of deformable material a textured surface element having a definite face pattern to thereby provide the deformable material with a face presenting a complete pattern complemental to the pattern of the element and then impressing on the deformable material face to a less depth a textured surface element in random relation to the complemental pattern to randomly modify the pattern of said material face while maintaining the general texture resulting from the first impression.

Additional examples of the prior art are found in U.S. Pat. No. 2,518,648; U.S. Pat. No. 2,955,324; U.S. Pat. No. 3,819,514; U.S. Pat. No. 3,839,514 U.S. Pat. No. 3,853,577; U.S. Pat. No. 3,848,043 and WO 86/03433.

In addition, Applicant's copending applications Ser. No. 699,207 filed May 13, 1991 which issued Dec. 1, 1992 as U.S. Pat. No. 5,167,991 and Ser. No. 084,081 filed Jun. 28, 1993 which is a continuation of Ser. No. 700,623 filed May 15, 1991 disclose methods of producing irregular surfaces with the use of a patterned tool.

SUMMARY OF THE INVENTION

The present invention relates to a patterned tool and method for producing a durable tactile warning surface for sidewalks and other walkways. As described more fully hereinafter, the tool and method produces the durable tactile warning surface comprising a base of colored or pigmented cementitious mortar or materials having a plurality of raised elements thereon visually contrasting with adjacent surfaces.

The durable tactile warning surface may be applied as a relatively thin layer to an existing sidewalk or produced with the sidewalk when initially poured.

To produce the cementitious mortar or material, sand, Portland cement, small aggregate, surfactant or wetting agent and water are introduced into a mixer and thoroughly mixed to produce a homogeneous cementitious mortar or material.

The homogeneous cementitious mortar is poured and leveled with a trowel or other suitable means.

The cementitious mortar or material is then stamped or impressed with the patterned tool and allowed to cure. Once cured, the upper surface of the base and raised elements are sealed.

The patterned tool comprises a substantially flat member having a plurality of symmetrically disposed recesses of a predetermined diameter and depth formed on the lower surface thereof and a plurality of corresponding vent channels formed through the substantially flat member in communication with each corresponding recess.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature and object of the invention, reference should be had to the following detailed description taken in connection with the accompanying drawings in which:

FIGS. 7 through 11 show steps of the method for producing the tactile warning surface as shown in FIG. 2.

Similar reference characters refer to similar parts throughout the several views of the drawings.

DETAILED DESCRIPTION OF THE PREFERRED EMBODIMENT

Figure 1:
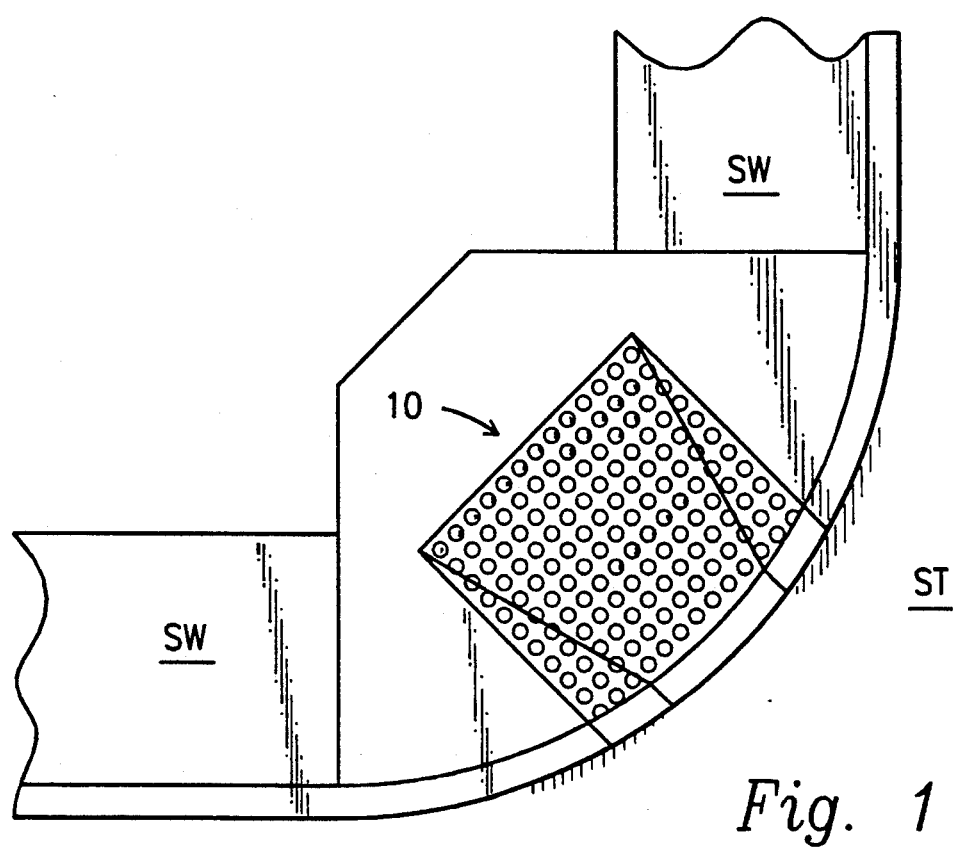
FIG. 1 is a top view of the tactile warning surface.
Figure 2:
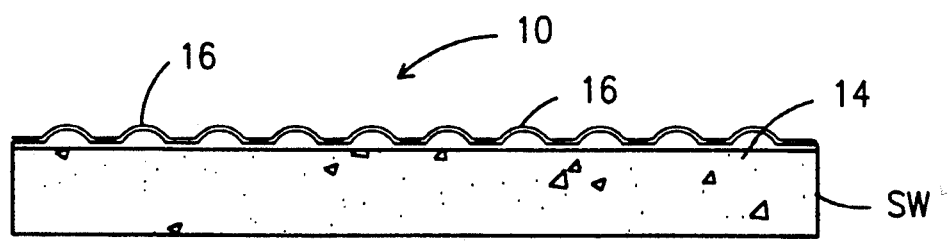
FIG. 2 is a cross-sectional side view of the tactile warning surface formed on an existing sidewalk.
Figure 3:
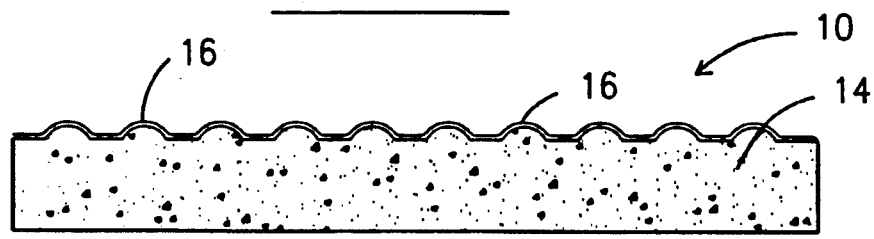
FIG. 3 is a cross-sectional side view of the tactile warning surface produced with a new sidewalk.
Figure 15:
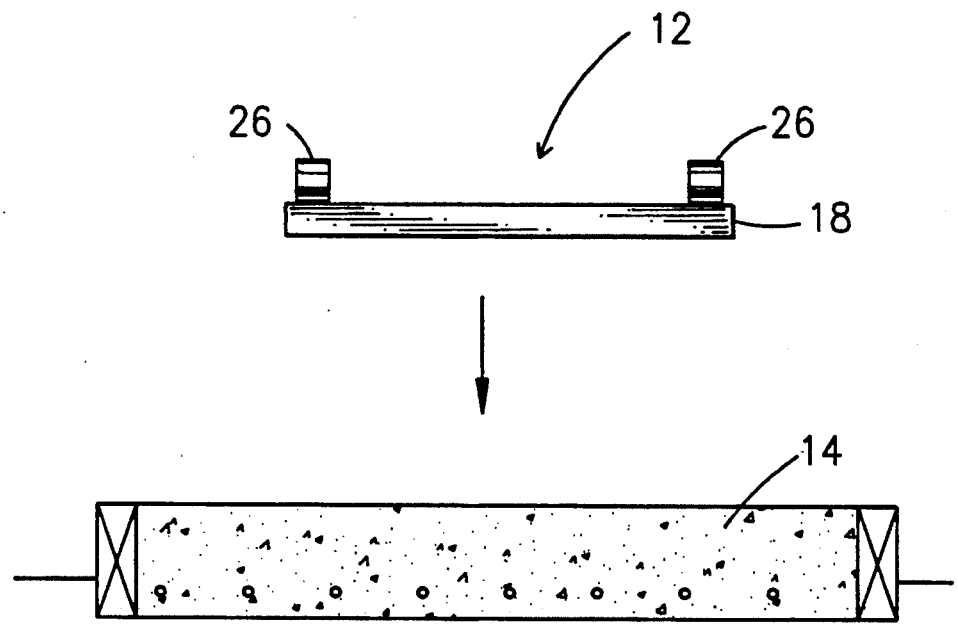
Figure 16:
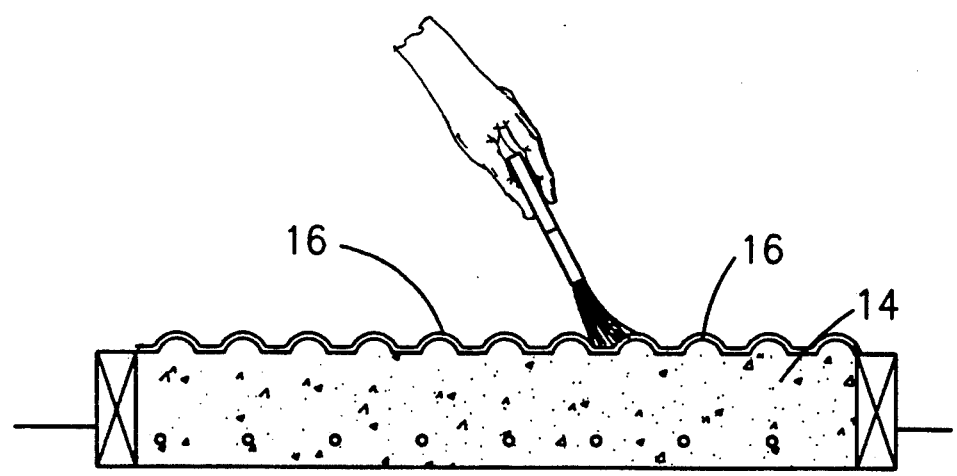

As best shown in FIGS. 1 through 3, the present invention relates to a method to produce a tactile warning surface generally indicated as 10 for sidewalks and other walkways and a patterned tool generally indicated as 12 in FIGS. 15 and 16 for production of the tactile warning surface 10. As described more fully hereinafter, the tactile warning surface 10 comprises an irregular, pigmented transition area located or disposed adjacent sidewalks SW and streets ST as well as other transistional walkway environs.

As shown in FIGS. 1 through 3, the tactile warning surface 10 comprises a base 14 having a plurality of symmetrically disposed raised elements each indicated as 16 of a predetermined diameter, height and spacing. In the preferred embodiment, each raised element 16 comprises a nominal height of 5 mm, nominal diameter of 23 mm and nominal center-to-center spacing of 60 mm. Although, the raised elements 16 are hemispheric or convex in shape, the raised elements 16 may be formed in other shapes such as truncated domes.

As described more fully hereinafter, the durable tactile warning surface 10 may be applied as a relatively thin layer to an existing sidewalk SW or produced with the sidewalk SW as the sidewalk SW is initially poured.

Figures 4, 5:
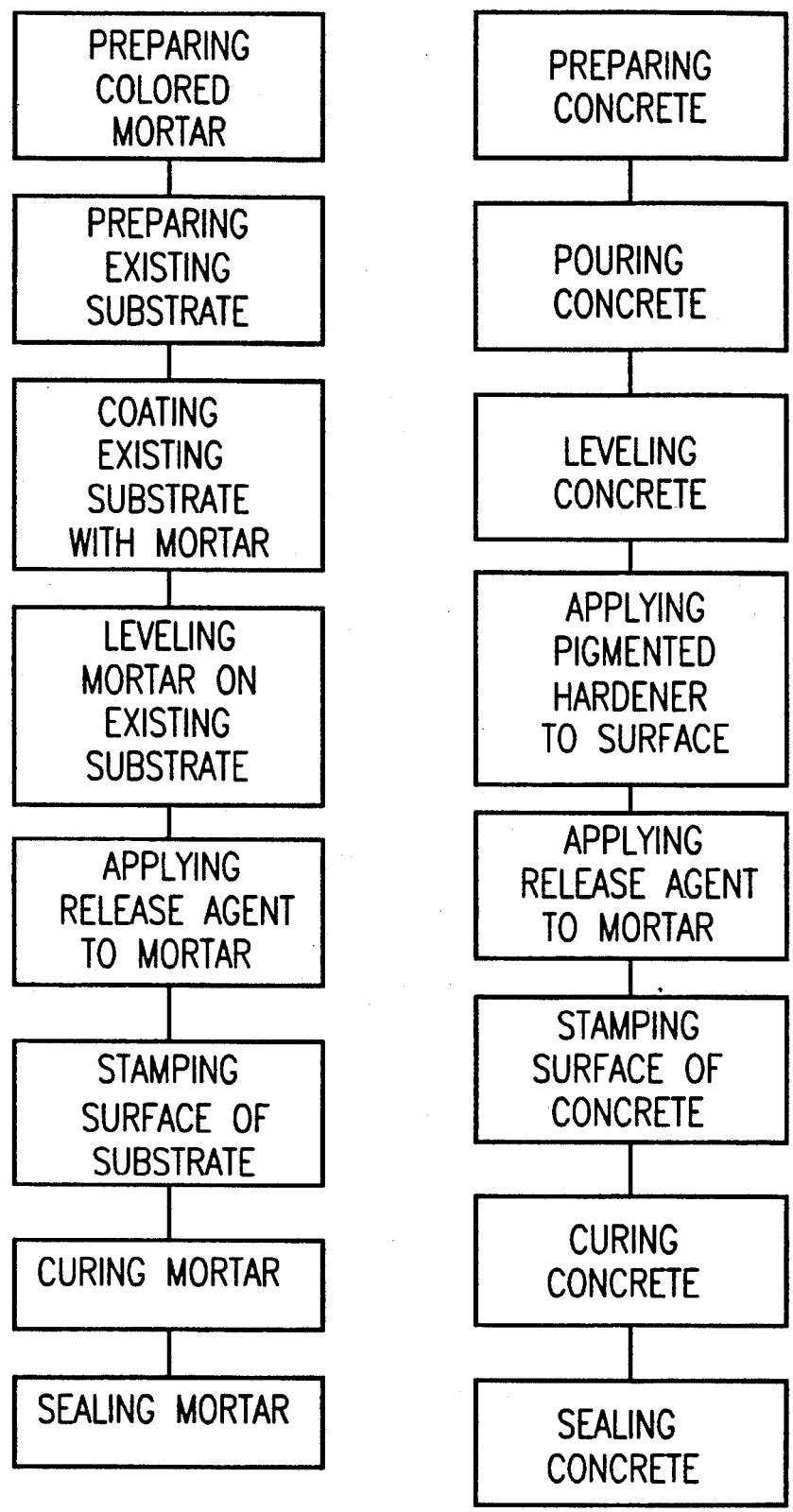
FIG. 4 is a flow chart of the steps of the method for producing the tactile warning surface on an existing surface as shown in FIG. 2.
FIG. 5 is a flow chart of the steps of the method for producing the tactile warning surface with a new sidewalk as shown in FIG. 3.

FIG. 4 is a flow chart of the method for producing the tactile warning surface 10 on an existing sidewalk SW or walkway comprising the steps of preparing a cementitious colored or pigmented polymer mortar, preparing existing sidewalk SW or substrate, coating the sidewalk SW or substrate with the cementitious colored or pigmented polymer mortar, leveling the cementitious polymer mortar to a substantially even thickness of approximately one quarter ($\frac{1}{4}$") inch, applying hydrophobic release agent to the surface of the cementitious colored or pigmented polymer mortar, stamping or impressing the surface of the cementitious colored or pigmented polymer mortar by pressing the patterned tool 12 on to form the plurality of raised elements 16, allowing the cementitious colored or pigmented polymer mortar to cure and seal the upper surface of the base 14 and plurality of raised elements 16 with an acrylic thermal plastic sealer to protect the tactile warning surface 10.

FIG. 5 is a flow chart of the method for producing the tactile warning surface 10 with the installation of a sidewalk SW or walkway comprising the steps of preparing a cementitious mortar, pouring the cementitious mortar into a mold or form, leveling the cementitious mortar to a substantially even thickness of approximately four (4") inches, applying pigmented hardener to the surface of the cementitious mortar and mix uniformly with the top quarter (¼") inch to form a integral part therewith, applying hydrophobic release agent to the surface of the cementitious mortar, stamping or impressing the surface of the cementitious mortar with the patterned tool 12 on the surface of the cementitious mortar to form the plurality of raised elements 16, allowing the cementitious mortar to cure and sealing the upper surface of the base 14 and plurality of raised elements 16 with an acrylic thermal plastic sealer to protect the tactile warning surface 10.

Figure 6:
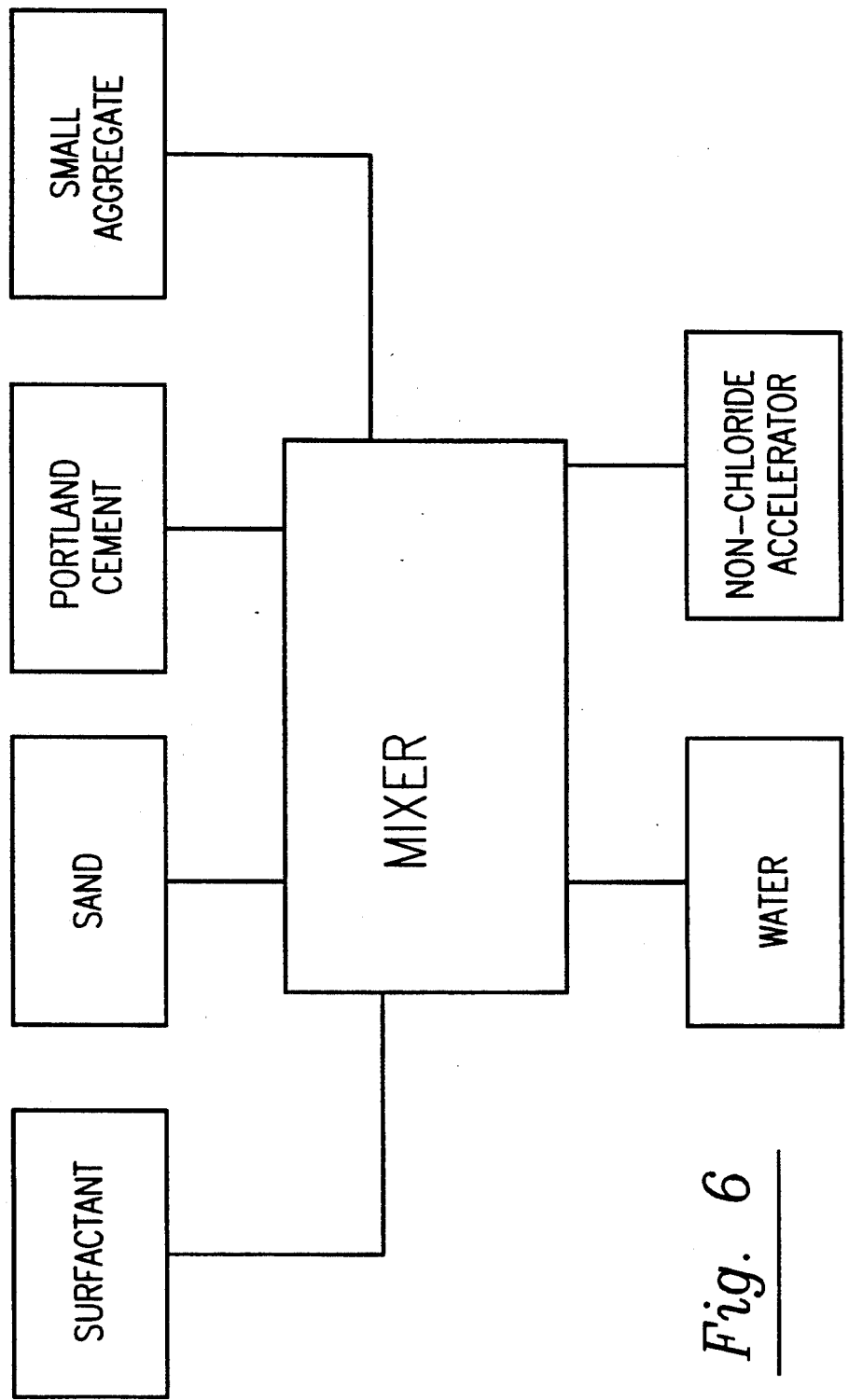
FIG. 6 is a schematic diagram of the steps of preparing the cementitious mortar used in the production of the tactile warning surface.

FIG. 6 is a schematic diagram depicting the preparation of the cementitious mortar. To produce a unit of the cementitious mortar to produce the tactile warning surface 10 on an existing sidewalk SW, a dry mixture comprising 30 pounds of silica sand with a gradation of 40/65 F. screening, 20 pounds of Portland cement, 0.1 to 0.5 pounds of iron oxide pigment as a base color and 0.325 pounds of surfactant or wetting agent to aid in uniform distribution of the iron oxide pigment are introduced into the mixer. Three quarts of water and three quarts of acrylic polymer are then added to the dry mixture and thoroughly mixed to produce the homogeneous cementitious polymer mortar. To produce a yard of the cementitious mortar or material to produce the tactile warning surface 10 with installation of a new sidewalk SW, 1,596 pounds of commercial grade sand, 410 pounds of Portland cement, 1,475 pounds of ⅛ to ⅜ inch small aggregate, 512 ounces of surfactant or wetting agent, 271 gallons of water and 3 ounces to 7 ounces of non-chloride accelerator per hundred weight of Portland cement are introduced into the mixer and thoroughly mixed to produce a homogeneous cementitious mortar or material.

FIGS. 7 through 11 show steps of the method for providing the tactile warning surface 10 on an existing sidewalk (SW). Specifically, as shown in FIG. 7, the homogeneous cementitious polymer mortar is poured onto or otherwise applied directly to the existing sidewalk SW or substrate.

As shown in FIG. 8, the homogeneous cementitious polymer mortar is then leveled to a substantially even thickness of one quarter (¼") inch with a trowel or other suitable means. The dry granular hydrophobic release agent is applied to the upper surface of the cementitious polymer mortar to prevent the cementitious polymer mortar from sticking to the patterned tool 12 as shown in FIG. 9.

As shown in FIG. 10, portions of the polymer mortar are displaced by pressing the patterned tool 12 onto the surface of the cementitious polymer mortar to form the plurality of raised elements 16. Once the cementitious mortar is allowed to cure, the upper surface of the base 14 and plurality of raised elements 16 are sealed with an acrylic thermal plastic sealer as shown in FIG. 11.

Figure 12:
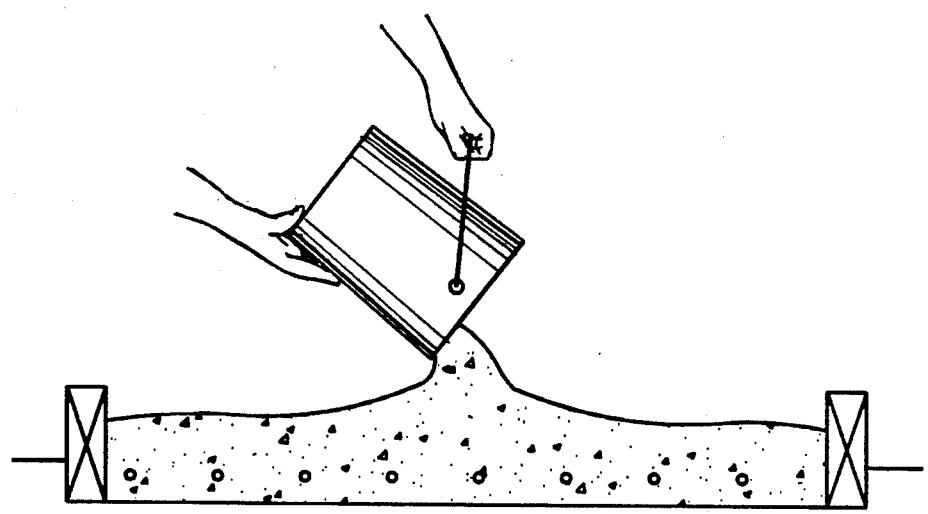
FIGS. 12 through 16 show steps of the method for producing the tactile warning surface as shown in FIG. 3.
Figure 13:
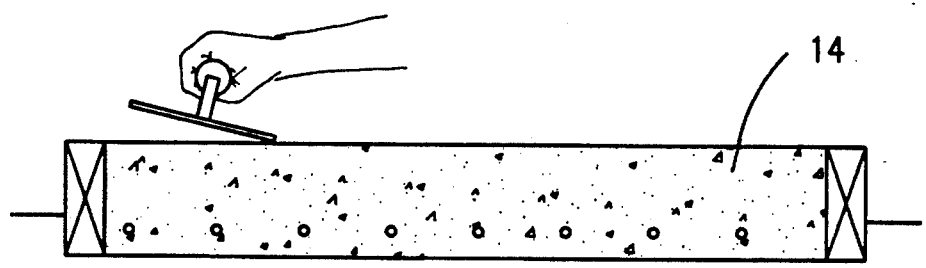

FIGS. 12 through 16 show steps of the method for producing the tactile warning surface 10 when installing or pouring a new sidewalk SW. Specifically, as shown in FIG. 12, the homogeneous cementitious mortar is poured into a form. The homogeneous cementitious mortar is then leveled with a trowel or other suitable means as shown in FIG. 13.

Figure 14:
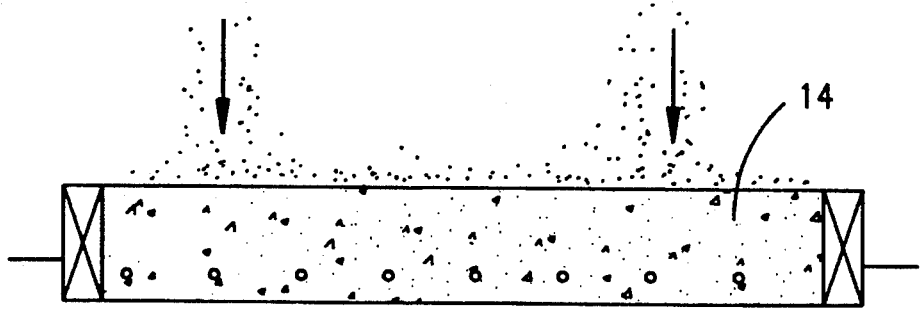

As shown in FIG. 14, a colored or pigmented hardener is applied to the upper surface of the cementitious mortar and mixed into the upper layer of the cementitious mortar. Then a hydrophobic release agent is applied to the upper surface of the colored cementitious mortar similar to the step shown in FIG. 9.

As shown in FIG. 15, portions of the cementitious mortar are displaced by pressing the patterned tool 12 onto the surface of the cementitious mortar to form the plurality of raised elements 16. Once the cementitious mortar is allowed to cure, the upper surface of the base 14 and plurality of raised elements 16 are sealed with an acrylic thermal plastic sealer as shown in FIG. 16.

Figure 17:
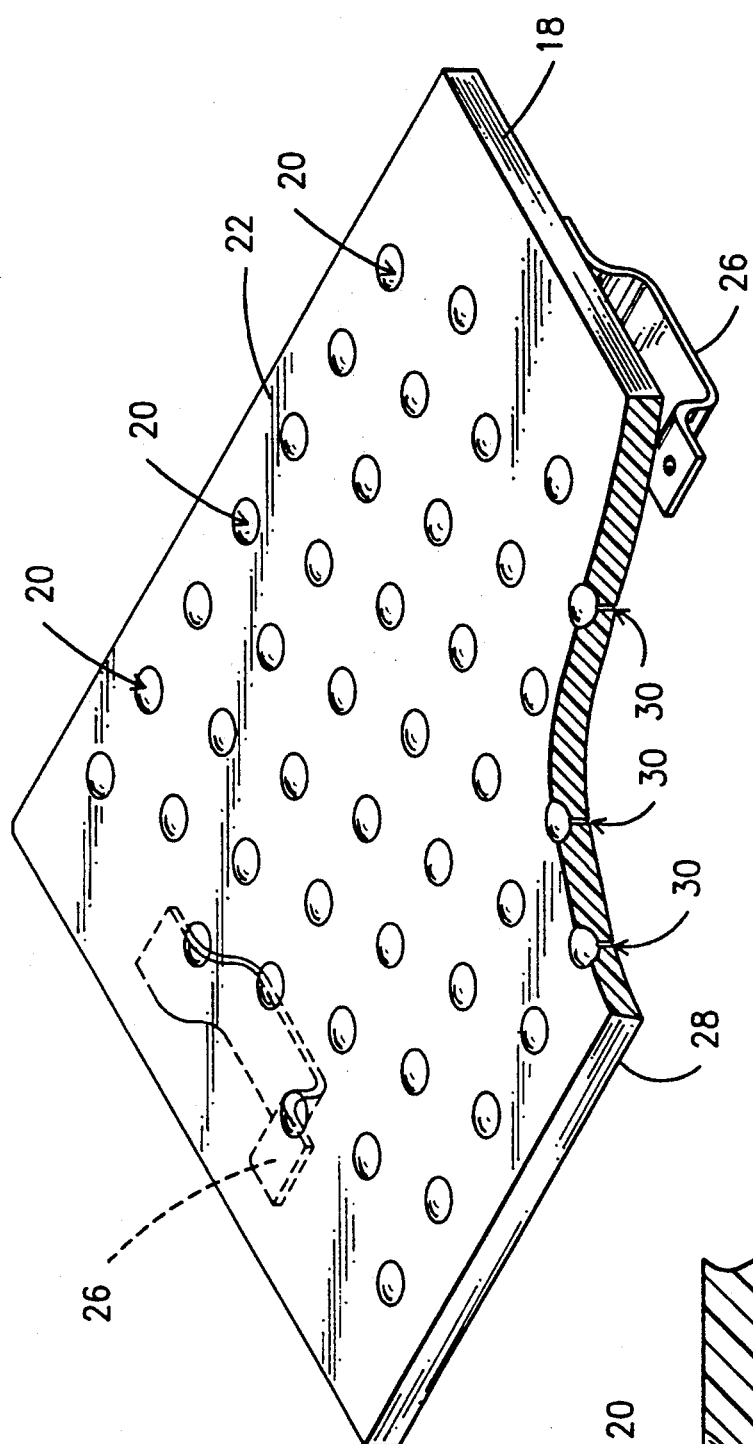
FIG. 17 shows a perspective bottom view of the patterned tool.
Figure 18:
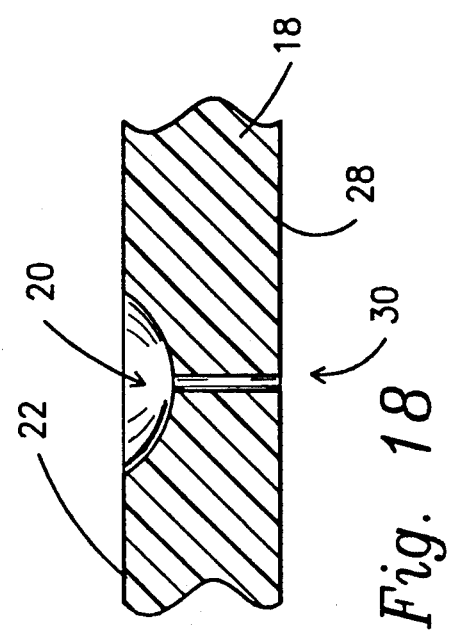
FIG. 18 is a partial cross-sectional side view of the patterned tool.

As shown in FIGS. 10, 15, 17 and 18, the patterned tool 12 comprises a body or member 18 having a plurality of recesses each indicated as 20 formed on the substantially flat lower surface 22 and a handle 24 (FIG.10) or straps 26 (FIGS. 15 and 17) attached to the upper surface 28 thereof. As best shown in FIG. 17, a plurality of vent channels each indicated as 30 each in communication with a corresponding recess 20 is formed therethrough the body or member 18 to allow air to escape from the recesses 20 during the stamping process. This precludes the deformation of the individual raised elements 16 when formed and prevents a buildup or accumulation of the release agent during repeated use of the patterned tool 12. The body or member 18 may be constructed of rigid or flexible material such as urethane rubber with a hardness of approximately 60 shore. The flexible body or member 18 permits the installer to peel the patterned tool from the cementitious mortar after stamping.

It will thus be seen that the objects set forth above, among those made apparent from the preceding description are efficiently attained and since certain changes may be made in the above construction without departing from the scope of the invention, it is intended that all matter contained in the above description or shown in the accompanying drawing shall be interpreted as illustrative and not in a limiting sense It is also to be understood that the following claims are intended to cover all of the generic and specific features of the invention herein described, and all statements of the scope of the invention which, as a matter of language, might be said to fall therebetween.

Now that the invention has been described,

What is claim is:

1. A method for producing a tactile warning surface as a sidewalk, the tactile warning surface including a base having a plurality of raised elements formed on an upper surface of the base comprising the following steps in sequence:

(a) preparing a cementitious mortar,
(b) pouring the cementitious mortar into a form,
(c) leveling the cementitious mortar,
(d) applying a pigment to the cementitious mortar,
(e) applying a hardener to the cementitious mortar,
(f) applying a release agent to an upper surface of the cementitious mortar,
(g) impressing the upper surface of the cementitious mortar with a patterned tool comprising a substantially flat flexible member having a plurality of symmetrically disposed recesses of a predetermined diameter and depth formed on a lower surface of the member to form the plurality of raised elements of the tactile warning surface on the upper surface of the cementitious mortar and the patterned tool comprising a plurality of vent channels each in communication with one of the recesses and formed through the member to vent air therethrough during the impressing step, (h) peeling the patterned tool from the upper surface of the cementitious mortar, (i) allowing the cementitious mortar to cure thus forming the tactile warning surface including the base and the plurality of raised elements on the upper surface of the base, and (j) sealing the cured upper surface of the base and thus the tactile warning surface with a sealer.

2. A method for producing a tactile warning surface on an existing sidewalk, the tactile warning surface including a thin layered base having a plurality of raised elements formed on an upper surface of the base comprising the following steps:

(a) preparing a homogenous polymer mortar of water, acrylic polymer, silica sand, Portland cement, iron oxide pigment and a surfactant, (b) coating the existing sidewalk with the polymer mortar, (c) leveling the polymer mortar to substantially one quarter inch in thickness to provide the base of the tactile warning surface, (d) applying a release agent to an upper surface of the polymer mortar that forms the base before displacing portions of the polymer mortar, (e) displacing portions of the polymer mortar by pressing the upper surface of the base with a patterned tool comprising a substantially flat flexible member having a plurality of symmetrically disposed recesses of a predetermined diameter and depth formed on a lower surface of the member to form the plurality of raised elements of the tactile warning surface and comprising a plurality of vent channels each in communication with one of the recesses formed through the member to vent air therethrough during the displacing step to shape the plurality of raised elements on the upper surface of the base, and (f) peeling the patterned tool from the upper surface of the base leaving the tactile warning surface including the plurality of raised elements formed on the upper surface of the base on the existing sidewalk.

* * * * *